Nov. 15, 1938.  C. R. RANEY ET AL  2,136,637
BORDER SCRAPER FOR HARVESTER-THRESHERS
Filed Nov. 13, 1936   2 Sheets-Sheet 1
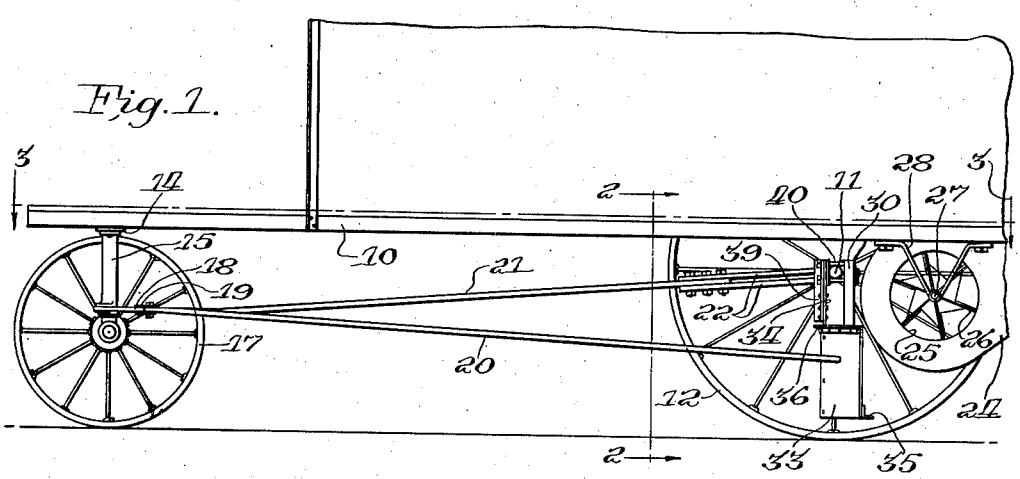
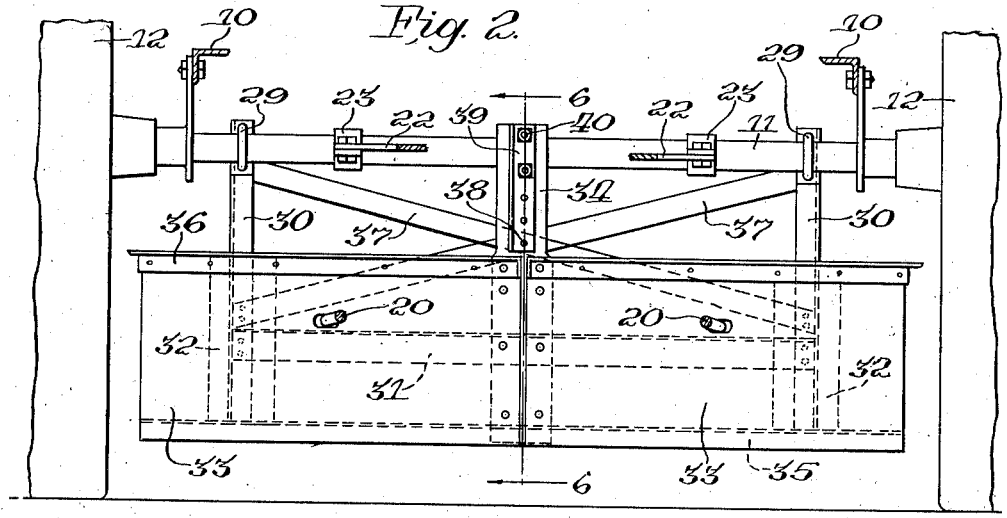
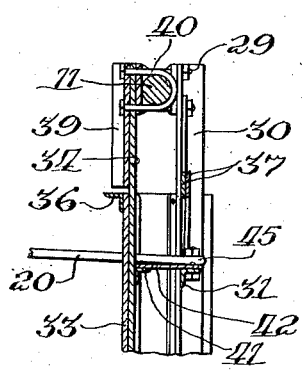
Inventors
Clemma R. Raney
and Albert B. Welty
By V. F. Lassagne
Atty.

Nov. 15, 1938.  C. R. RANEY ET AL  2,136,637
BORDER SCRAPER FOR HARVESTER-THRESHERS
Filed Nov. 13, 1936   2 Sheets-Sheet 2

Inventors
Clemma R. Raney
and Albert B. Welty
By
Atty.

Patented Nov. 15, 1938

2,136,637

UNITED STATES PATENT OFFICE 2,136,637

BORDER SCRAPER FOR HARVESTER-THRESHERS

Clemma R. Raney, Riverside, and Albert B. Welty, Moline, Ill., assignors to International Harvester Company, a corporation of New Jersey Application November 13, 1936, Serial No. 110,702

10 Claims. (Cl. 130—27)

The invention relates to border scrapers for harvester threshers or similar wheeled machines.

Harvester threshers, as is well known in the art, comprise a longitudinal body carried on a transverse wheel supported axle, the body enclosing separating mechanism including an underslung blower housing disposed behind the wheel axle. In ordinary fields which the harvester thresher traverses, this blower housing is sufficiently high above the ground so that it will not come in contact therewith and be damaged.

When the harvester thresher is to traverse irrigated fields, a serious problem is encountered because of the existence of so-called borders formed in the fields for retaining the water supplied thereto. When the harvester thresher with its underslung blower housing is driven over such a border, the blower housing may, and frequently does, contact these borders, with the result that the blower housing is damaged.

The purpose of this invention is to provide a simple and sturdy scraper blade arrangement to be hung from the harvester thresher axle between the wheels in advance of the depending blower housing, so that, when the machine is pulled over these irrigation borders, the scraper will serve to scrape off so much of the border as is necessary to permit the blower housing of the harvester thresher to pass thereover without being damaged.

The main object of the invention is to provide an improved scraper for the purposes stated.

Another object is to provide an improved means for mounting the scraper on the harvester thresher axle.

Another object is to provide an improved means for bracing the scraper, so that it will be sturdy and satisfactorily perform its intended function.

Another object is to so construct the scraper structure that it may be easily mounted in place on the harvester thresher, or removed therefrom, without in any way having to alter the standard construction of the machine with which the scraper blade is to be used.

Other objects will be apparent to those versed in this art as the disclosure is more fully made.

In the accompanying sheets of drawings, the improved scraper of this invention is illustrated in detail, said drawings showing a practicable form which the invention may assume. In these drawings:

Figure 1 is a general side elevational view of so much of a harvester thresher as is necessary to illustrate the scraper of this invention and its relation to the blower housing behind the axle of the harvester thresher;

Figure 2 is a cross sectional view, taken along the line 2—2 of Figure 1 looking in the direction of the arrows, and showing a front elevational view of the scraper and its mounting on the harvester thresher axle;

Figure 3:
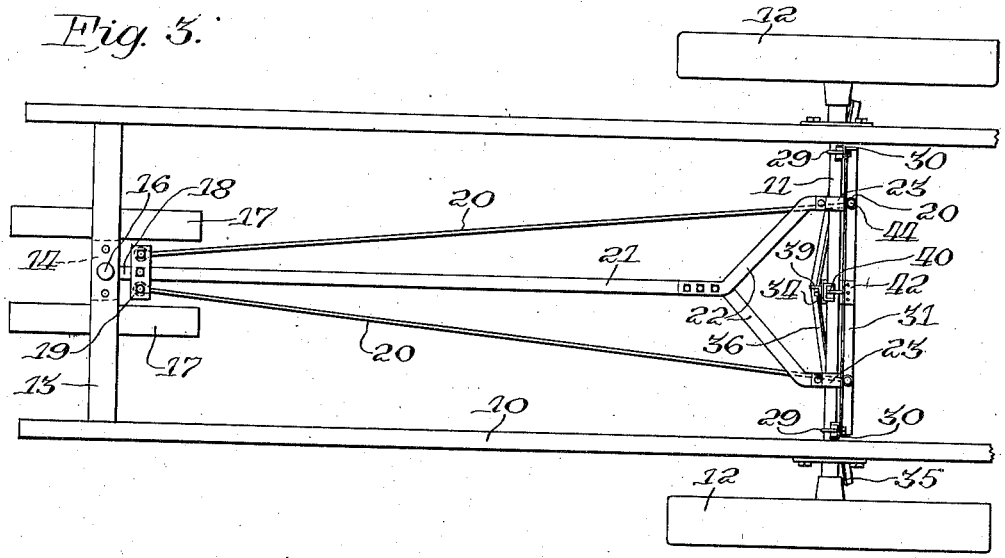
Figure 3 is a plan view of the structure shown in Figure 1 with the body of the harvester thresher removed, taken along the line 3—3 of Figure 1 and looking in the indicated direction.

The harvester thresher shown may be of any standard form, and, for the sake of illustration, it comprises a longitudinal main frame 10 carried at its rear end on a transverse axle 11, which is journaled in a pair of carrying wheels 12. The front end of the frame includes a crossbar 13, below which is carried a plate 14 serving as a means for supporting from underneath the bar 13 a vertical standard 15, which is rigid with the frame and in which is carried a vertical spindle 16 for a front steerable wheel carriage or truck 17. The rigid standard 15 has securely fastened thereto a rearwardly extending plate 18, at the rear end of which is carried a transverse cross-plate 19, said plate 19 also being rigid and each end thereof having connected thereto a pair of rearwardly diverging and slightly downwardly extending rods 20.

Figure 4:
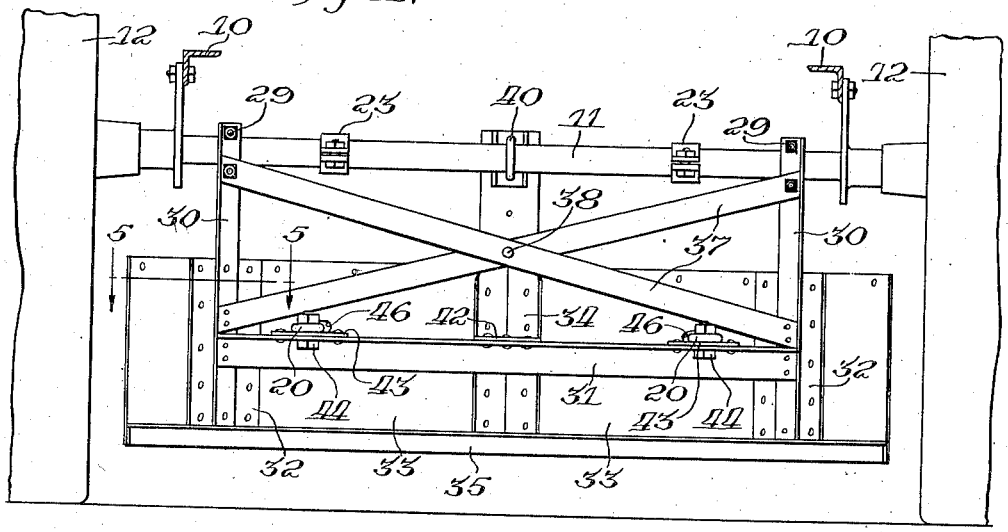
Figure 4 is a rear elevational view of the structure shown in Figure 2.

The longitudinal plate 18 includes a reach bar extension 21 extending longitudinally rearwardly and upwardly, the rear end including diverging, bifurcated extensions 22, which, as shown in Figures 2 and 4, are rigidly bolted to respective transversely spaced points on the axle 11 by means of clamps 23.

The scraper of this invention is hung from the axle 11 in a manner presently to be described in advance of a depending blower housing 24 suspended from underneath the main frame 10 of the harvester thresher, as shown in Figure 1, said blower housing at its opposite ends being open, as at 25, to provide air intakes, and through which can be seen the usual blower 26 carried on a transverse shaft 27 journaled in end brackets 28, only the near one of which is shown, connected to the under side of the thresher body 10. When the harvester thresher is drawn over borders when harvesting crops in irrigated fields, the bottom of the blower housing 24 is apt to, and frequently does, contact with great force these borders, with the result that the blower housing becomes damaged, and to prevent such damage the scraper now to be described is provided in advance of the blower housing to level off the border in advance of the blower housing as the machine travels along the field, to clear the way for the passage of the blower housing through a border.

Figure 5:
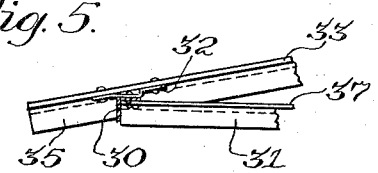
Figure 5 is a view, partly in section, taken along the line 5—5 of Figure 4, showing a structural detail; and, Figure 6 is a vertical cross sectional view taken through the scraper structure as seen along the line 6—6 of Figure 2, looking in the indicated direction.

Accordingly, as seen in Figures 2 and 4, each end of the axle 11, outwardly of the clamp brackets 23, is provided with quickly attachable and detachable U-bolt clamps 29 for securely fastening to the axle depending angle bars 30 arranged parallel with each other, said bars extending downwardly, as shown, to a point just high enough above the ground level to clear ordinary or minor obstructions. The lower portions of these angle bars, as shown in Figures 4 and 5, are securely connected to a transverse angle bar 31. Connected to the lower half of each depending angle bar 30 is an obliquely disposed bracket or plate 32, each plate 32 having connected thereto on its front face a vertical plate section constituting oblique scraper blades 33, these two blades forming a slight V with the apex running ahead of the ends thereof and being joined by a rigid, vertical angle angle plate 34 to secure the inner ends of the scraper blades 33 together. The lower end of the scraper blade on its back side is backed by a strengthening angle bar 35, as shown in Figure 4 to which the lower ends of the bars 30 extend. The upper top edge of the scraper blade 33 is strengthened by an angle bar 36 disposed on the front side of the scraper blade 33.

The vertical angle bar posts 30 are crossbraced by braces 37, as shown, and where the braces cross they are riveted securely together, as at 38. The upper end of the corner plate 34 on its front side has secured thereto a vertical angle bar 39, which carries a U-bolt clamp 40 for connecting the angle plate 34 and the scraper structure securely to the axle 11 at a point intermediately of the ends of the axle, as shown, and substantially midway between the end bars 30.

The back side of the vertical plate 34, at the same level as the angle bar cross brace 31, carries angle bar sections 41 behind the scraper blade 33, which, at their inner ends behind the plate 34, serve to mount a rearwardly extending plate 42, which is securely riveted to the top horizontal flange of the cross angle bar 31.

Each end of the transverse angle bar 31, on the horizontal flange of said bars, carries a horizontal plate 43. This plate serves to connect in a fore and aft direction the ends of the angle bar sections 41 with the angle bar sections 31, said plates 43 and the angle bar sections 31 serving further to carry a vertical bolt 44, to which is secured the eye 45 formed at the rear ends of each of the rods 20 heretofore described, said rods passing through appropriate openings 46 formed in the scraper blade sections 33, so that the coupling of the rods 20 may be made at the securely braced angle bar 31 in back of the scraper blade 33. This completes the details or structure of the improved scraper and the manner of its attachment to the axle.

It is obvious that the scraper blade structure is practically a unit and that it has three points of connection through the two clamp brackets 29 and the middle clamp bracket 40 with the axle and that the only other connection of the scraper blade to the body of the machine is through the rods 20, that are connected at their front ends to the cross plate 19. In use, as the machine traverses the ground the sturdy scraper blade structure serves to level off a border which the machine is to cross, thereby clearing a path substantially as wide as the wheel tread to enable the blower housing 24 to cross or clear the border without being damaged by coming into contact therewith.

It can be seen that the disclosed structure is practicable and has great utility for the purpose intended. It is also clear that said structure achieves the desirable objects heretofore recited for the invention.

It is the intention to cover all changes and modifications of the example shown and described which do not in material respects constitute departures from the spirit and scope of the invention, said invention being covered by the following claims.

What is claimed is:

1. In a harvester thresher having a body supported on a transverse axle and a pair of spaced wheels, said body rearwardly of the axle carrying a depending blower housing having its bottom spaced above the ground, the combination with said body of a substantially vertical scraper blade suspended rigidly below the body between said wheels and in advance of said blower housing, the bottom edge of the scraper being disposed at a height between the ground and the bottom of the housing.

2. In a harvester thresher having a longitudinal body carried on a wheel supported transverse axle, a depending blower housing carried below the body rearwardly of the axle, the combination with said axle of a pair of spaced frame bars detachably connected to and suspended therefrom in advance of the blower housing, cross members carried by said bars, and a scraper blade carried rigidly by said bars and members.

3. In a harvester thresher having a longitudinal frame carried adjacent its rear end on a transverse axle including a pair of spaced wheels and at its forward end on a steering wheel truck, and a depending blower housing carried below the body rearwardly of the axle, the combination with said axle of a scraper rigidly suspended therefrom in advance of the blower housing, said scraper being transversely disposed between the rear wheels, and tension members connected between the scraper and a rigid part of the body adjacent the front wheel truck.

4. In a harvester thresher having a longitudinal body carried adjacent its rear end on a wheel supported transverse axle and at its forward end on a steering wheel truck including a rigid part, a depending blower housing carried below the body rearwardly of the axle, the combination with said axle of a scraper rigidly suspended therefrom in advance of the blower housing, and tension means connected between the scraper and said rigid part.

5. In a harvester thresher having a longitudinal body carried adjacent its rear end on a wheel supported transverse axle, a depending blower housing carried below the body rearwardly of the axle, the combination with said axle of a plurality of spaced vertical frame members having their upper ends detachably connected to the axle and depending from said axle, braces interconnecting said frame members, and a scraper blade mounted on said frame members in advance of the blower housing.

6. In a harvester thresher having a longitudinal body carried on a pair of spaced wheels and a transverse axle, a depending blower housing carried below the body rearwardly of the axle, and a V-shaped scraper blade carried rigidly below the body in advance of the housing, said blade being transversely disposed and substantially spanning the space between said wheels.

7. In a harvester thresher having a longitudinal body carried adjacent its rear end on a wheel supported transverse axle and at its forward end on a steering wheel truck, and a depending blower housing carried below the body rearwardly of the axle, the combination with said axle of a scraper rigidly suspended therefrom in advance of the blower housing, said scraper blade including a trussed frame detachably connected to the axle, a pair of rearwardly diverging tension rods connected at their front ends to the body adjacent the steering wheel truck, said rods at their rear ends being passed through respective openings formed in the blade, and means to anchor the rear ends of said rods to said trussed frame.

8. In a vehicle having a body suported on a transverse axle and a pair of wheels, said body rearwardly of the axle carrying a comparatively fragile depending part, having its bottom disposed a substantial distance below the axle and spaced above the ground to be susceptible of damage by uneven portions of the ground, the combination with said body of a substantially vertical, comparatively sturdy blade suspended below the body in advance of said depending part to protect said part by engaging said uneven ground, the bottom edge of said blade being disposed at a height between the ground and the depending part.

9. In a vehicle having a body supported on a transverse axle and a pair of wheels, said body rearwardly of the axle carrying a comparatively fragile depending part, having its bottom disposed a substantial distance below the axle and spaced above the ground to be susceptible of damage by uneven portions of the ground, said part at its upper portion being closely associated with the body portion, the combination with said body of a substantially vertical, comparatively sturdy blade suspended below the body in advance of said part, the vertical extent of said blade being from a point below the part and above the ground to a point above the bottom of the part to protect said part by engaging said uneven ground portions.

10. In a vehicle having a body supported on a transverse axle and a pair of wheels, said body rearwardly of the axle carrying a comparatively fragile depending part, having its bottom disposed a substantial distance below the axle and spaced above the ground to be susceptible of damage by uneven portions of the ground, the combination with the body of a substantially vertical, comparatively sturdy blade suspended below the body in advance of and closely adjacent the part, said blade closely overlying and depending below a considerable portion of the part below the axle to protect said part by engaging said uneven ground portions, the bottom of said blade being disposed at a height between the ground and the bottom of the part to pass over even ground portions.

CLEMMA R. RANEY.
ALBERT B. WELTY.